United States Patent
Baauw

(10) Patent No.: US 10,398,150 B2
(45) Date of Patent: Sep. 3, 2019

(54) SEPARATING TISSUE FROM AN INTESTINE

(71) Applicant: VAN HESSEN B.V., Nieuwerkerk A/D Ijssel (NL)

(72) Inventor: Arie Baauw, Groot-Ammers (NL)

(73) Assignee: VAN HESSEN B.V., Nieuwerkerk A/D Ijssel (NL)

( * ) Notice: Subject to any disclaimer, the term of this patent is extended or adjusted under 35 U.S.C. 154(b) by 0 days.

(21) Appl. No.: 16/060,477

(22) PCT Filed: Dec. 8, 2016

(86) PCT No.: PCT/NL2016/050858
§ 371 (c)(1),
(2) Date: Jun. 8, 2018

(87) PCT Pub. No.: WO2017/099597
PCT Pub. Date: Jun. 15, 2017

(65) Prior Publication Data
US 2018/0360056 A1 Dec. 20, 2018

(30) Foreign Application Priority Data
Dec. 11, 2015 (NL) .................................... 2015948

(51) Int. Cl.
*A22C 17/00* (2006.01)
*A22C 17/16* (2006.01)
(Continued)

(52) U.S. Cl.
CPC ............... *A22C 17/16* (2013.01); *A22B 5/08* (2013.01); *A22B 5/10* (2013.01); *A22C 17/14* (2013.01)

(58) Field of Classification Search
CPC .......... A22C 17/00; A22C 17/14; A22C 17/16
(Continued)

(56) References Cited

U.S. PATENT DOCUMENTS

| 5,580,304 A | * | 12/1996 | Bleth ................... A22B 5/0094 452/122 |
| 7,828,636 B2 | * | 11/2010 | Larson ................... A22C 17/16 452/123 |
| 2015/0017895 A1 | | 1/2015 | Al-Laham |

FOREIGN PATENT DOCUMENTS

| GB | 1080417 | 8/1967 |
| NL | 34253 | 12/1934 |

OTHER PUBLICATIONS

International Search Report, issued in PCT/NL2016/050858, dated Jan. 20, 2017.
(Continued)

*Primary Examiner* — Richard T Price, Jr.
(74) *Attorney, Agent, or Firm* — Birch, Stewart, Kolasch & Birch, LLP

(57) ABSTRACT

For separating an intestine from a cluster of organs harvested from an animal, in particular a pig, cow or sheep, wherein the intestine is connected to the remainder of the cluster through tissue, a device and method are provided. The intestine separating device includes a guiding device having at least one guiding surface configured to contact the intestine. The guiding device includes first and second guiding members together defining a gap for accommodating the tissue. The first and second guiding members are movable towards and away from each other to vary a gap width. A gap width control structure includes an actuator to controllably decrease and increase the gap width. A tissue separating device is operative in the gap to provide a separation in the tissue close to the intestine.

30 Claims, 3 Drawing Sheets

(51) Int. Cl.
  *A22B 5/08*   (2006.01)
  *A22B 5/10*   (2006.01)
  *A22C 17/14*  (2006.01)
(58) Field of Classification Search
  USPC .................................................. 452/114, 123
  See application file for complete search history.

(56) References Cited

OTHER PUBLICATIONS

Written Opinion of the International Searching Authority, issued in PCT/NL2016/050858, dated Jan. 20, 2017.
Machine translation of NL-34253, published Jul. 16, 1934.

* cited by examiner

SEPARATING TISSUE FROM AN INTESTINE

FIELD OF THE INVENTION

The invention relates to the field of harvesting intestines from a cluster of organs and tissue from an animal. More specifically, the invention relates to a device and method for separating tissue from an animal intestine in an intestine harvesting process.

BACKGROUND OF THE INVENTION

Animal intestines, in particular the small intestines as connected between the stomach and the large intestines, when properly processed, are a valuable and well-appreciated natural product which can be used, for example, as casing, or case, or skin, of sausages, and for other purposes. This is especially true for intestines of pigs, cows and sheep.

In an animal slaughtering process, a cluster of organs is removed from a body cavity of an animal. Next, organs and tissue are separated from the cluster to be further processed.

In one of these separating steps, at least a part of the cluster comprising an intestine and at least one other organ, such as the stomach, and tissue, is brought to an intestine separating station for separating the intestine from a remainder of the cluster, or part of the cluster. The cluster or cluster part may be hanging from a support of a mechanical transport device, such as a conveyer. The conveyor, which may be an endless conveyor, comprises a series of supports, each carrying a cluster or cluster part. By moving the supports continuously, or intermittently, one cluster or cluster part at a time is presented at the intestine separating station. The intestine separating station may be part of a so-called gut room for processing intestines.

Traditionally, at a separating station, a person separates the intestine by hand. The person holds a knife, comprising a handle and a one-sided elongated cutting blade, such as a razor blade, connected to the handle, in his or her hand. The knife and the intestine, while still connected to the cluster or cluster part, are moved relative to each other, whereby the knife moves closely along the intestine near its outer surface, and in its longitudinal direction.

In the intestine separating process, the intestine needs to be separated from deformable fatty tissue in which blood vessels leading to and from the intestine are embedded. Such blood vessels are also indicated by the term "whiskers". In the harvesting of the intestine, it needs to be ensured that a separation or cut is made as closely as possible to the intestine to remove the fatty tissue as much as possible, and to obtain whiskers having a shortest possible length, without damaging the intestine.

The person, or operator, handling the knife must be educated and experienced in performing this task, which takes a relatively long time in practice.

The required working position for the operator's hand holding the knife is quite unnatural and uncomfortable, and may lead to symptoms in the hand, arm and related body parts of the operator.

As an example of a further tool for separating an intestine and fatty tissue from each other, reference US 2015/0017895 A1 discloses a device for separating an intestine subjected to a pulling force from a structure such as a fatty structure connected to the intestine by means of cutting. The device comprises a guide for guiding at least the intestine, and a cutting member connected to the guide for severing the structure in the vicinity of the intestine. The cutting member is adapted to sever the structure as closely as possible to the intestine. The cutting member has a cutting edge directed toward an open feed end of the guide. The guide comprises a gap arranged therein, the gap being adapted to guide the separation between the intestine and the fatty structure connected with the intestine from the feed end of the gap. The cutting member comprises a knife connected to the guide with its cutting edge at a distance from the guide. The cutting edge of the knife is connected to a holder in exchangeable manner at an angle differing from 90 degrees to the main direction of the gap.

Both the knife as handled traditionally by a person, or operator, and the device of reference US 2015/0017895 A1 have a disadvantage in that in practice a scraping action is performed with the knife cutting edge to separate the intestine from other tissue. The knife blade can only be used to separate a few hundreds of intestines before the cutting edge of the blade becomes unsuited for further use, and the blade needs to be replaced. This impedes the separation process, and leads to relatively high costs.

In addition, the device of reference US 2015/0017895 A1 is unsuitable for separating the intestine from the organ(s) to which it is connected in the digestive tract of the cluster of organs being processed, or to make a separation in the intestine. As an example, before performing the intended tissue separation in relation to a small intestine, the stomach usually has already been removed from the cluster of organs. Before the intended tissue separation, however, a short length section of the small intestine (previously) adjacent to the stomach must also be separated from the small intestine (herein referred to as "intermediate separation"), since this section cannot be used in the intended further processing of the small intestine. Furthermore, an opposite end of the small intestine must be separated from the adjacent large intestine by separating the connection between the small intestine and the large intestine (herein referred to as "large intestine separation"). For the intermediate separation and the large intestine separation, the small intestine cannot be brought into contact with the cutting edge of the knife, since the cross-section of the small intestine is too large to pass through the gap of the guide. Thus a further separating or cutting device is needed to cut said connections, which again impedes the tissue separating process, and therefore leads to inefficiency and loss of time and money.

NL 34253 C discloses an apparatus for cutting away a layer of fat from an intestine, comprising a rotatable circular knife or a reciprocating knife, and a security device comprising a pair of horns to guide the intestine and the apparatus relative to each other. The horns define a gap across which the knife may cut.

SUMMARY OF THE INVENTION

It would be desirable to provide a separating device and method for harvesting a maximum length of intestine from a cluster of organs. It would also be desirable to provide a separating device and method for harvesting an intestine from a cluster of organs without damage to the intestine. It would further be desirable to provide a separating device and method for harvesting an intestine from a cluster of organs with a low whisker length. It would still further be desirable to provide a separating device with low maintenance. It would also be desirable to provide a separating device having a long use interval without a need to exchange operational parts. It would further be desirable to provide a separating device having a low complexity. It would still further be desirable to provide a separating device and method which can be used by a relatively low-trained person, or operator, having low experience, and yet obtain excellent separating results. It would also be desirable to provide a separating device which can be handled comfortably for a relatively long time by a person, without causing symptoms.

To better address one or more of these concerns, in a first aspect of the invention a device for separating an intestine, in particular, but not limited to, a small intestine, from a cluster of organs harvested from an animal, in particular a pig, cow or sheep, is provided. The intestine is connected to the remainder of the cluster through tissue, the intestine separating device comprising:

a guiding device having at least one guiding surface configured to contact the intestine, the guiding device defining a gap being configured to accommodate said tissue;

a tissue separating device configured to be operative in the gap to provide a separation in the tissue close to the intestine, wherein the guiding device comprises a first guiding member and a second guiding member together defining the gap between the first guiding member and the second guiding member, the first guiding member and the second guiding member being movable towards and away from each other to vary a gap width, wherein a gap width control structure is provided, comprising an actuator to controllably decrease the gap width, and to controllably increase the gap width.

The gap may be open(ed) when the first guiding member is at a distance from the second guiding member. The intestine separating device further allows the gap the be closed, or almost closed, when the first guiding member rests, or almost rests, against the second guiding member. Said distance is at least as large as an average or maximum expected thickness of the tissue, taking into account that the tissue is deformable.

In use, an intestine is moved along the separating device to pull tissue into the gap towards a tissue separation location in the gap where the tissue separating device is operative. In the gap, by friction generated between, on the one hand, the first guiding member and the second guiding member and, on the other hand, the tissue, the tissue is tensioned near the separation location to provide a reliable and easy separation.

A varying gap width allows for an adjustment of the actual gap width to an actual thickness of the tissue moving along the gap towards the tissue separation location, the thickness direction extending in the width direction of the gap. The thickness of the tissue may vary not only from one intestine of one animal to another intestine from another animal, but also when processing one intestine, where the tissue may have varying thickness at different locations along the intestine.

The actuator may be a mechanical device operated by hand, or a mechanical device operated by a motor, such as an electric, pneumatic or hydraulic motor, possibly controlled by a feedback device measuring a force or pressure exerted by the first and second guiding members on the tissue to maintain the force or pressure at a predetermined level.

In a simple embodiment, the first guiding member and the second guiding member are rotatable relative to one another to vary the gap width.

The variable width of the gap, in which the tissue is moving to reach the separation location, by virtue of the first and second guiding members being movable relative to one another, allows the tissue to reach the separation location without getting jammed in a gap which would have a fixed width which would be too narrow for the tissue to pass, whereby the separation location could not be reached. Also, it allows the tissue to reach the separation location while generating sufficient friction between to tissue and the first and second guiding members without the friction being too low or even zero in a gap which would have a fixed width which would be wider than the tissue thickness. So, by selecting, and being able to continuously adjusting to, an appropriate gap width, a friction force is exerted on the tissue by the first and second guiding members contacting opposite sides of the tissue, to thereby optimize the separation made by the tissue separating device in terms of separation quality and separation location.

In addition, by moving the first and second guiding members away from each other such that the gap between the first and second guiding members can take up the intestine as seen in cross-section, the intestine separating device can also be directly used to separate the intestine at an intermediate position, or from connected organs in the digestive tract, such as the stomach or the large intestine, when the intestine to be harvested is the small intestine. Advantageously, this leads to a very efficient overall separating process.

Furthermore, it has been found that a person operating the separating device needs relatively low training and experience to perform the separating task satisfactorily.

In an embodiment of the intestine separating device, the first guiding member comprises a first guiding surface, and a second guiding member comprises a second guiding surface, wherein the first guiding surface and the second guiding surface are configured to contact the intestine.

The first guiding surface and the second guiding surface have a function of providing a predetermined distance between, on the one hand, the separation location in the tissue as obtained by the tissue separating device, and the intestine surface on the other hand, to ensure that the tissue is separated from the intestine at a short distance from the intestine without damage to the intestine. The first guiding surface and the second guiding surface provide their function reliably even at different gap widths.

In an embodiment of the intestine separating device, the first guiding member comprises a first side facing a second side of the second guiding member, the first side and the second side together defining the gap.

Said first side and second side may be substantially flat faces. These flat face may be extending, in use of guiding tissue between them, substantially parallel to each other, or extending at an angle of at most 20° relative to each other when seen in a direction at right angles to a direction of movement of the tissue through the gap. Thus, at least a part of the first side and second side can, in use of the intestine separating device, be in contact with the tissue to generate a friction force to promote an optimum separation in the tissue made by the tissue separating device.

In an embodiment of the intestine separating device, the gap comprises a tapering tissue inlet area. In a further embodiment of the intestine separating device, the first guiding member and the second guiding member each comprise a rounded end portion at a tissue inlet area of the gap.

A tapering tissue inlet area, i.e. a tapering in the area of the gap where tissue enters the gap, promotes a smooth moving of the tissue into the gap, even if the tissue would sway as a result of its movement. A similar effect is obtained by designing the first and second guiding members to have a rounded end portion.

In an embodiment of a mechanical actuator device operated by hand, the actuator comprises a first handle and a second handle movable relative to each other, wherein the first guiding member is connected to the first handle, and the second guiding member is connected to the second handle, whereby the first guiding member and the second guiding member move towards each other to decrease the gap width of the guiding device when the first handle and the second handle move toward each other, and whereby the first guiding member and the second guiding member move away from each other to increase the gap width of the guiding device when the first handle and the second handle move away from each other.

An operator handling the actuator, and normally also being able to observe a result of his or her actions, may take the first handle and second handle in one hand to move them away from each other or towards each other to adjust the gap width. In a convenient embodiment of the intestine separating device, a spring member is provided for moving the first handle away from the second handle to a first end position relative to each other. Particularly, the spring member may be mounted between the first handle and the second handle.

In the first end position, the first guiding member is at a distance from the second guiding member, and the gap therefore is open to receive tissue in it. The gap may be decreased by contracting the operator's hand to move the first handle towards the second handle, to a gap width which is adapted to allow the tissue to move through the gap, and to be optimally cut in the gap by the tissue separating device. The operator, by observing the separating process by tactile feedback from the handles, and by visual feedback, may adjust the gap for the separating process to be completed in an optimum manner.

The first and second handles provide a comfortable grip for the operator which can be sustained for a relatively long time.

In a simple and effective embodiment of the intestine separating device, the first guiding member is fixedly connected to the first handle, and the second guiding member is coupled to the second handle by a mechanical transmission, in particular a linkage. Other mechanical transmissions are conceivable too, such as a gear, to connect a handle to a guiding member.

In an embodiment of the intestine separating device, the first handle and the second handle are rotatable relative to each other around a hinge axis.

With such a constructive solution, the operator handling the intestine separating device having the first handle and the second handle can accurately select an appropriate gap width between the first and second guiding members.

In order to prevent the operator from closing the gap between the first and second guiding members completely, or to prevent the operator from inadvertently decreasing the gap to a gap width which would prevent a proper operation of the intestine separating device, or which would make the tissue jam in the gap, the intestine separating device may further comprise a stop member for limiting a movement of the first handle and the second handle towards each other in a second end position relative to each other. In an embodiment, the stop member is mounted between the first handle and the second handle.

In an embodiment, the intestine separating device comprises a locking member to lock and unlock the positions of the first handle and the second handle relative to each other, and to lock and unlock the positions of the first guiding member and the second guiding member relative to each other. The locking member may be adjustable to obtain different locked second end positions as required.

In an embodiment of the intestine separating device, the tissue separating device comprises a rotatably driven cutting member.

In use of a device for separating an intestine from a cluster of organs harvested from an animal, some 20 meters of intestine are to be processed in about 10 seconds time. Assuming a continuously ongoing operation, 8 hours of use of the intestine separating device means providing a cutting length of the tissue separating device of more than 57 kilometers. By providing a rotatably driven cutting member, a relatively long operational time of the tissue separating device can be reached, contrary to e.g. using a stationary cutting member such as a razor blade.

In an embodiment of the intestine separating device, the cutting member is circle knife having a peripheral cutting edge, in particular, but not limited to, a plain (i.e. non-serrated) cutting edge.

In practice, such a circle knife has shown to have a high performance, in particular in terms of high operational time, low wear, easy whetting, easy replacement, etc.

In an embodiment of the intestine separating device, part of the cutting edge extends across the gap, to ensure a separation in the tissue closely to the intestine.

In an embodiment of the intestine separating device, the cutting member extends in a plane extending at an angle between 20° and 60°, and more in particular about 45°, to the guiding surface of the guiding device.

Positioning the plane of the rotatable cutting member at an angle to the guiding surface of the guiding device implies that in the separating process the tissue separated from the intestine diverges from the intestine. Thereby the intestine is drawn against the guiding surface(s) of the guiding device to closely follow the guiding surface(s) to obtain a constant low distance between the surface of the intestine and the actual separation location in the tissue.

In an alternative embodiment of the intestine separating device, the tissue separating device comprises a water jet cutter operative across the gap.

An advantage of a water jet cutter is a very long operational time without replacement of parts.

In an embodiment of the intestine separating device, a water supply duct configured to supply water to the tissue separating device.

The supply of water to the tissue separating device, in particular the supply of hot water having a temperature of at least 40° C., more in particular at least 60° C., has a cleaning effect on the tissue separating device, to remove tissue residues from the tissue separating device. The relatively high temperature of the water prevents the tissue from solidifying and becoming adhered to the tissue separating device, which would impede its function. In addition, the water may be supplied to at least part of the area of the gap, in particular to the area of the gap where the tissue separating device operates on the tissue, to provide a lubricating effect to enhance the separating action of the tissue separating device.

In an embodiment of the intestine separating device, the tissue separating device, embodied as a cutting member, is driven by a hydraulic motor. An oil supply duct and an oil discharge duct may be used to power the hydraulic motor. In some embodiments, the same water supply duct as used to supply water to the tissue separating device may be used to also feed water to the hydraulic motor, if the hydraulic motor is powered by water instead of oil under pressure. However, also a separate other water supply duct may be provided to feed water to the hydraulic motor powered by water. An advantage of using a hydraulic motor is its reliability, its power, and its relatively silent operation.

In another embodiment of the intestine separating device, the tissue separating device, embodied as a cutting member, is driven by a pneumatic motor.

An advantage of a pneumatic motor, as well as of a hydraulic motor, is that they can safely be used in the wet environment in which the intestine separation is performed, contrary to e.g. an electric motor which can cause electric hazards for the operator and other people handling the separating device, and for electric installations in case of insulating faults and short circuits. However, use of an electric motor in the intestine separating device to drive the cutting member is not precluded in any way.

In a second aspect of the present invention, a method of separating an intestine from a cluster of organs harvested from an animal, in particular a pig, cow or sheep, is provided. The intestine is connected to the remainder of the cluster through tissue. The method comprises:

moving the intestine in its longitudinal direction relative to a guiding device;

guiding the tissue into a gap of the guiding device, at least one guiding surface of the guiding device contacting the intestine;

providing, in the gap, a separation in the tissue close to the intestine, wherein the guiding device comprises a first guiding member and a second guiding member being movable towards and away from each other to vary a gap width, wherein the method further comprises:

before starting the guiding of the tissue into the gap, positioning the first guiding member and the second guiding member away from each other to set a width of the gap;

after starting the guiding of a first part of the tissue into the gap, moving the first guiding member and the second guiding member towards each other to decrease the width of the gap to exert a friction force on the tissue; and maintaining a decreased width of the gap during a guiding of the remaining part of the tissue in the gap.

These and other aspects of the invention will be more readily appreciated as the same becomes better understood by reference to the following detailed description and considered in connection with the accompanying drawings in which like reference symbols designate like parts.

DETAILED DESCRIPTION OF EMBODIMENTS

Figure 1:
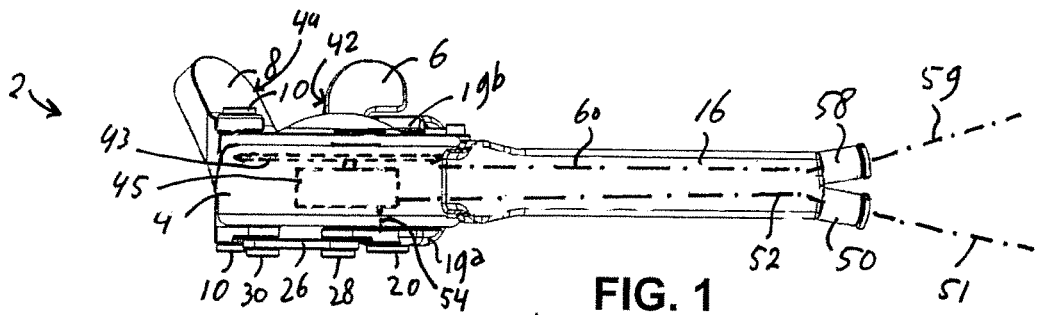
FIG. 1 depicts a top view of a device for separating an intestine from a cluster of organs harvested from an animal according to the present invention, guiding members of the intestine separating device being in a first, open, position relative to each other.

FIGS. 1 to 4 show an intestine separating device 2 for separating an intestine from a cluster of organs harvested from an animal, in particular a pig, cow or sheep.

The intestine separating device 2 comprises a housing 4 having, in the embodiment shown, a substantially cylinder-shaped exterior form. The cylinder shape, however, is not essential, and may be another appropriate shape, such as a rectangular box shape.

A first guiding member 6 and a second guiding member 8 are coupled to the housing 4, or to a frame inside the housing 4 which is fixed to the housing 4. In the embodiment shown, the first guiding member 6 is fixed relative to the housing 4, whereas the second guiding member 8 is movable, in particular rotatable around an axis defined by a shaft 10 in opposite directions indicated by arrows 12a, 12b. The shaft 10 is mounted in the housing 4 or a frame thereof. The second guiding member 8 is fixedly connected to a guiding member arm 14, such that rotation of the guiding member arm 14 around the axis of the shaft 10 provokes an equivalent rotation of the second guiding member 8.

A first handle 16 and a second handle 18 are coupled to the housing 4, or to a frame inside the housing 4 which is fixed to the housing 4. In the embodiment shown, the first handle 16 is fixed relative to the housing 4, whereas the second handle 18 is movable, in particular rotatable around an axis defined by a shaft 20 in opposite directions indicated by arrows 22a, 22b. For this purpose, the second handle 18 is provided with a fork-shaped mounting portion comprising first fork arm 19a and second fork arm 19b, wherein both the first fork arm 19a and the second fork arm 19b are rotatably connected to the shaft 20. The shaft 20 is mounted in the housing 4 or a frame thereof. The second handle 18, in particular its first fork arm 19a, is fixedly connected to a handle arm 24, such that rotation of the second handle 18 around the axis of the shaft 20 provokes an equivalent rotation of the handle arm 24.

A free end of the handle arm 24 is rotatably connected to one end of a link 26 through a first hinge 28. A free end of the guide member arm 14 is rotatably connected to another end of the link 26 through a second hinge 30.

A rotation of the second handle 18 around the axis of the shaft 20 in the direction of arrow 22b, whereby the second handle 18 moves towards the first handle 16, leads, through transmission by the link 26, to a rotation of the second guiding member 8 around the axis of the shaft 10 in the direction of arrow 12b. Also, a rotation of the second handle 18 around the axis of the shaft 20 in the direction of arrow 22a, whereby the second handle 18 moves away from the first handle 16, leads, through transmission by the link 26, to a rotation of the second guiding member 8 around the axis of the shaft 10 in the direction of arrow 12a.

It is observed here that instead of a linking mechanism comprising the guiding member arm 14, the link 26, and the handle arm 24, another mechanical transmission may be applied. An example of an alternative mechanical transmission is a gear transmission provided outside the housing 4. It is further observed that the linking mechanism or any alternative mechanical transmission may be provided inside the housing 4 to protect its component parts from damage or contamination.

A rotation in the direction of arrow 22b of the second handle 18 around the axis of the shaft 20 towards the first handle 16 requires exerting a squeezing force, in particular by hand, between the first handle 16 and the second handle 18 to compress a spring member 32 mounted between the first handle 16 and the second handle 18. If the squeezing force is released, the spring member 32 will move the first handle 16 and the second handle 18 away from one another by rotation of the second handle 18 in the direction of arrow 22a.

An adjustable stop member 34 fixed to the first handle 16 has a free end which will contact the second handle 18 during a rotation of the second handle 18 in the direction of arrow 22b around the axis of the shaft 20. This contact stops the rotation. The length of the stop member 34 may be adjusted, to adjust the position of the first handle 16 and the second handle 18 relative to each other wherein said contact takes place.

For the oppositely directed rotations of the second handle 18 relative to the first handle 16, there are two end positions of the first handle 16 and the second handle 18 relative to each other.

In a first, open, position of the guiding members 6, 8, as shown in FIGS. 1 to 4, corresponding to a first end position of the first handle 16 and the second handle 18 relative to each other, the second handle 18, in particular its second fork arm 19b, contacts the first guiding member 6 which is fixed to the housing 4, in a rotation of the handle 18 in the direction of arrow 22a. This contact prevents the second handle 18 to move further in the direction of arrow 22a. Here, 'open' refers to a gap 40 between the first guiding member 6 and the second guiding member 8 being relatively wide.

Figure 5:
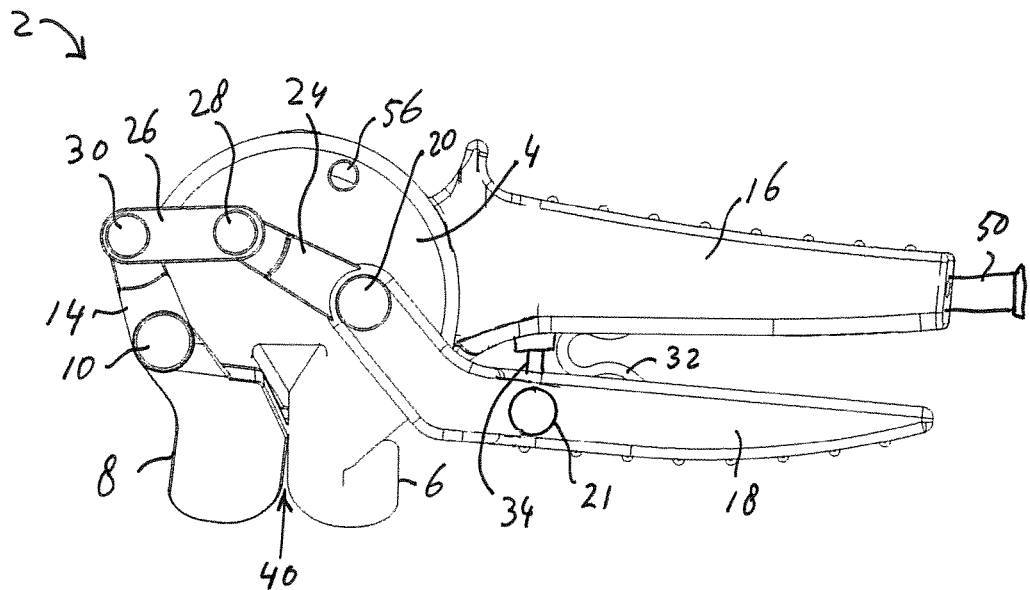
FIG. 5 depicts a second view of the first side of the intestine separating device of FIG. 1, the guiding members of the intestine separating device being in a second, closed, position relative to each other.

In a second, closed, position of the guiding members 6, 8, as shown in FIG. 5, corresponding to a second end position of the first handle 16 and the second handle 18 relative to each other, the free end of the stop member 34 contacts the second handle 18, in a rotation of the handle 18 in the direction of arrow 22b. This contact prevents the second handle 18 to move further in the direction of arrow 22b, and thus also prevents the first guiding member 6 and the second guiding member 8 to move further towards one another. Here, 'closed' refers to the gap 40 being relatively narrow.

As an example, the second handle 18 may be provided with a locking member 21 acting on the stop member 34 to lock and unlock the positions of the first guiding member 6 and the second guiding member 8 relative to each other, by locking and unlocking the positions of the first handle 16 and the second handle 18 relative to each other. Thus, a predetermined gap width, for example about 1 mm, between the first guiding member 6 and the second guiding member 8 can be set and maintained by using the locking member 21 in a locking state during the tissue separation. At the same time, the locking member then will absorb a spring force exerted by the spring member 32, so that a hand of a person gripping the first and second handles 16, 18 can be more relaxed.

It is observed here that the second, closed, end position, instead of being determined by the free end of the stop member 34 contacting the second handle 18, may alternatively be determined by the second guiding member 8 and the first guiding member 6 contacting each other. It is to be remembered that a rotation of the second handle 18 around the axis of the shaft 20 in the direction of arrow 22b leads, through the linkage between the second handle 18 and the second guiding member 8, to a rotation of the second guiding member 8 in the direction of arrow 12b, thereby moving the second guiding member 8 and the first guiding member 6 towards each other. During the latter movement, and without other restrictions, the first guiding member 6 and the second guiding member 8 will contact each other, thereby preventing further movement of the second guiding member 8 in the direction of arrow 12b, and consequently, through the linkage between the second guiding member 8 and the second handle 18, a further movement of the second handle 18 in the direction of arrow 22b is also prevented.

Referring to FIGS. 1 to 6, the first guiding member 6, in the particular embodiment shown, has a shape of a hockey stick being rounded at its end. The second guiding member 8, in the embodiment shown, has a shape of a finger being also rounded at its end. The first guiding member 6 comprises a first guiding surface 36, and the second guiding member comprises a second guiding surface 38, wherein the first guiding surface 36 and the second guiding surface 38 are configured to contact an intestine in an intestine separating process, wherein the intestine is connected to a remainder of a cluster of organs through tissue.

The first guiding member 6 and the second guiding member 8 together define the gap 40 between the first guiding member 6 and the second guiding member 8. As explained above, the first guiding member 6 and the second guiding member 8 are movable towards and away from each other. Hereby, a width of the gap 40 is varied. The gap 40 is configured for accommodating said tissue.

The first guiding member 6 comprises a first side 42 facing a second side 44 of the second guiding member 8. The first side 42 and the second side 44 together define the gap 40. The first handle 16 and the second handle 18 together function as an actuator in a gap width control structure further comprising the linkage from the second handle 18 to the second guiding element 8, to controllably decrease the gap width, and to controllably increase the gap width. The rounded end portions of the first guiding member 6 and the second guiding member 8, which partly comprise the first side 42 and the second side 44, respectively, together determine a tapering tissue inlet area.

Figure 2:
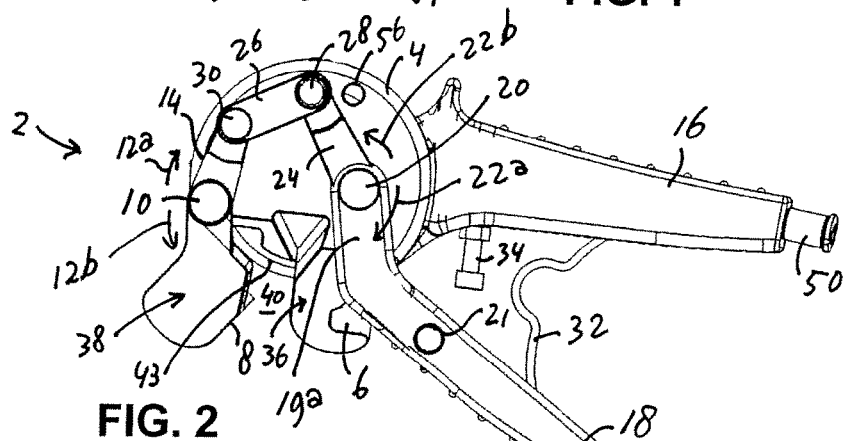
FIG. 2 depicts a first view of a first side of the intestine separating device of FIG. 1.
Figure 3:
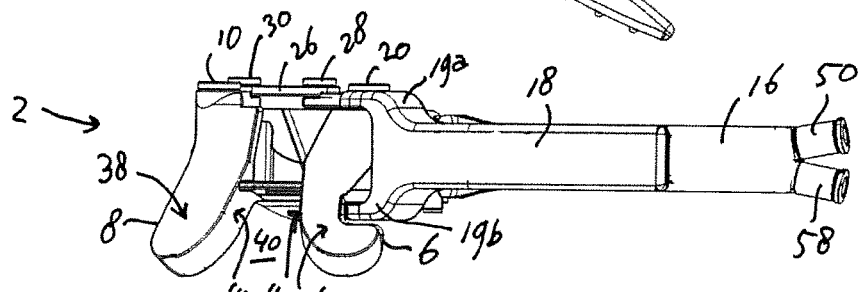
FIG. 3 depicts a bottom view of the intestine separating device of FIG. 1.
Figure 6:
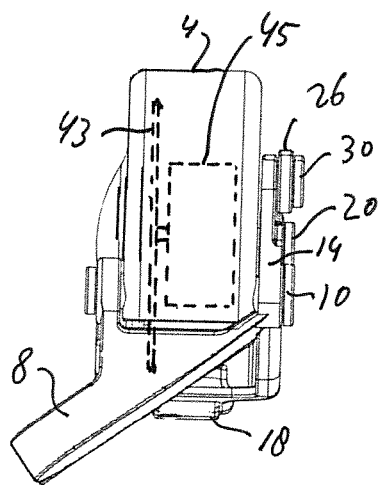
FIG. 6 depicts a front view of the intestine separating device of FIG. 1 in the closed position of the guiding members.

In the housing 4, a tissue separating device, embodied as a rotating cutting member, in particular a rotating circle knife 43, is provided, as shown in particular in FIGS. 2 and 6. The circle knife 43 has a plain cutting edge. Part of the cutting edge of the circle knife 43 extends across the gap 40.

The circle knife 43 is driven by a motor 45 for rotating the circle knife 43. The motor 45 basically may be of a pneumatic, hydraulic or electric type. In the embodiment shown, the motor is of a pneumatic type. For a supply of pressurized air for activating the pneumatic type motor 45, the first handle 16 is provided with an air supply terminal 50 configured to be coupled to a pneumatic line 51 (schematically indicated by a dash-dotted line), and an air inlet duct 52 (schematically indicated by a dash-dotted line) leading from the air supply terminal 50 to the pneumatic type motor 45. The housing 4 comprises an air outlet duct 54 (schematically indicated by a dash-dotted line) leading from the pneumatic type motor 45 to the environment through an air outlet opening 56 in the housing 4.

The first handle 16 further is provided with a water supply terminal 58 configured to be coupled to a water supply line 59, and a water inlet duct 60 (schematically indicated by a dash-dotted line) leading from the water supply terminal 58 to the circle knife 43, in particular to a space in the housing 4 surrounding the circle knife 43 and/or an area of the gap 40 where (part of) the cutting edge of the circle knife 43 is operative in making a separation in tissue. The water preferably is hot water. The hot water preferably has a temperature of at least 40° C., more in particular at least 60° C.

It is observed that instead of a pneumatic type motor 45, a hydraulic type motor can be applied to drive the circle knife 43. In such an embodiment, when the hydraulic type motor is adapted to be fed with pressurized water, the water inlet duct 60 may be coupled to the hydraulic type motor, and a water outlet of the hydraulic type motor may be in fluid communication with the space in the housing 4 surrounding the circle knife 43 and/or an area of the gap 40 where (part of) the cutting edge of the circle knife 43 is operative in making a separation in tissue. In other embodiments, the water fed hydraulic type motor may be connected to another water inlet duct. In still other embodiments, when the hydraulic type motor is adapted to be fed with pressurized oil, a separate oil supply duct and a separate oil discharge duct may be provided similarly to, and replacing the air inlet duct 52 in the first handle 16.

Figure 4:
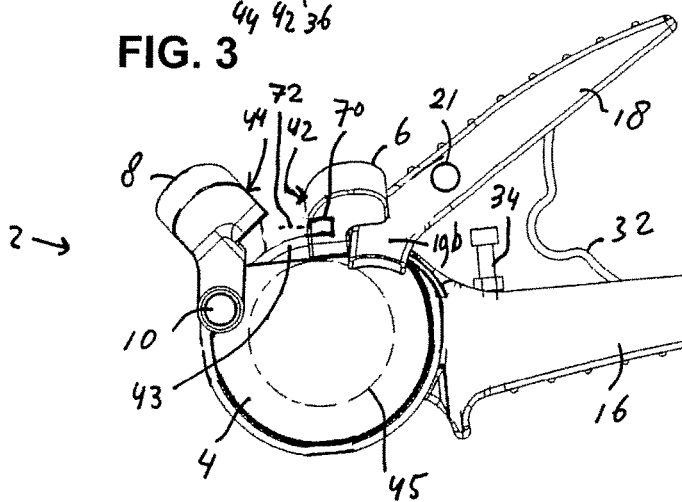
FIG. 4 depicts a second side view of the intestine separating device of FIG. 1.

It is further observed that instead of a circle knife 43, a water jet device may be applied for making a separation in tissue. A water jet device 70 is schematically indicated in FIG. 4, jetting a water jet 72 ("water knife") across the gap 40 for cutting tissue. In such an embodiment, any other tissue separating device may be absent, in particular the circular knife 43 and its driving motor 45. In an embodiment comprising the water jet device 70, the water inlet duct 60 may be coupled to the water jet device 70 to supply water to it. In other embodiments, the water jet device 70 is coupled to a separate water supply duct.

As shown in FIG. 6, the first guiding member 6 and the second guiding member 8, in particular their first guiding surface 36 and 38, respectively, generally extend at an angle of about 45° to the general plane of the circle knife 43, or the direction of the cutting edge thereof. Other angles between 20° and 60° are also possible.

Figure 7:
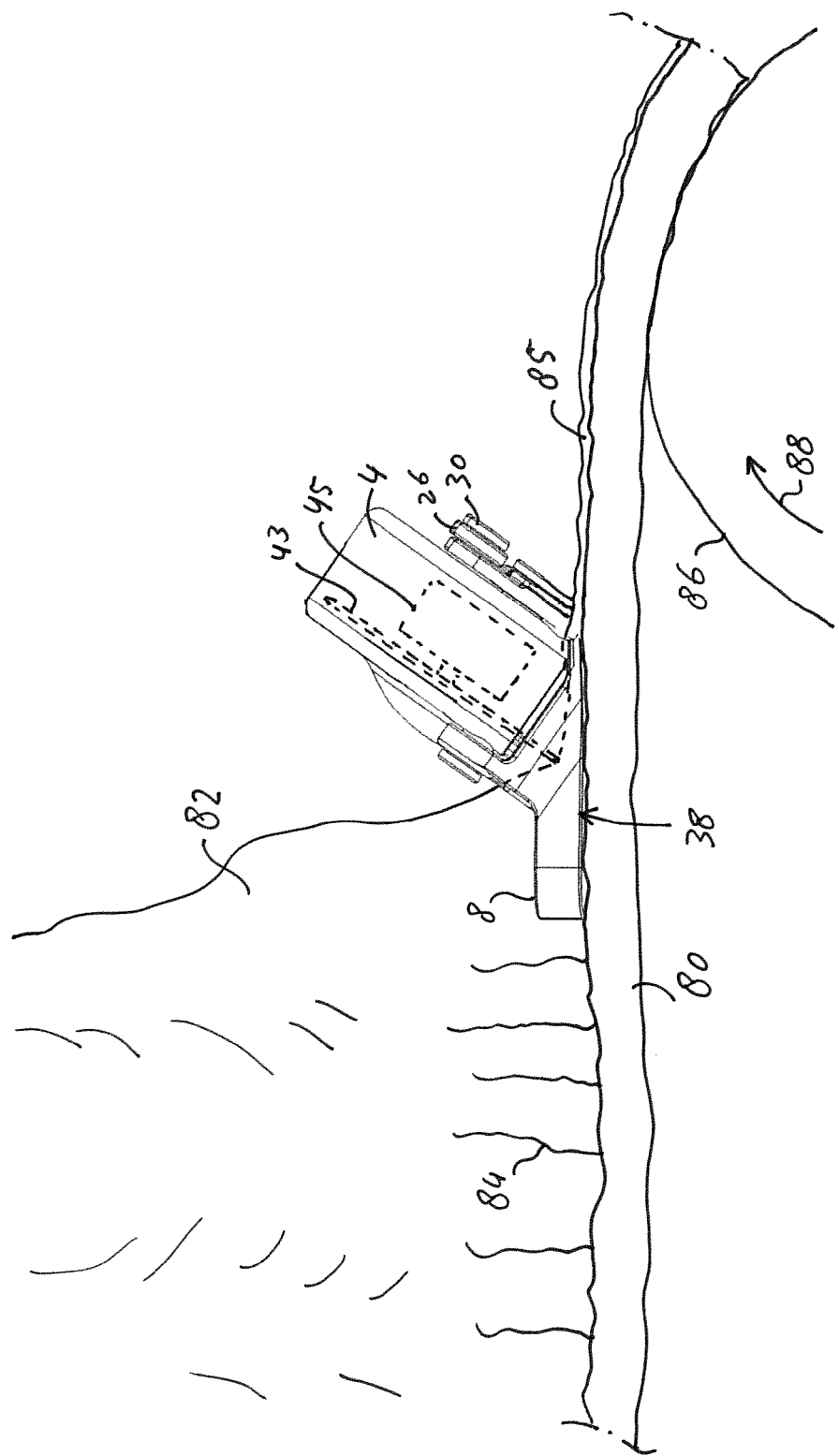
FIG. 7 illustrates a separating operation of the intestine separating device on an intestine connected to tissue.

An operation of the intestine separating device 2 is illustrated in FIG. 7.

As schematically shown in FIG. 7, an intestine 80 hangs from tissue 82. The intestine 80 is connected to organs harvested from an animal through the tissue 82. The tissue 82 comprises fatty tissue and blood vessels 84 (also referred to as whiskers), is generally curtain-shaped, and is connected to the intestine 80 substantially at a strip-like area along the length of the intestine 80.

An end of the intestine 80 is coupled to, e.g. laid onto, an outer circumference of a wheel 86 rotating in a direction of arrow 88. The intestine 80 is taken along by the wheel 86 by friction. Said end of the intestine 80, if a small intestine is concerned, may be obtained by performing said intermediate separation in the intestine 80 as explained above. The intermediate separation can be made with the intestine separating device 2, wherein the gap 40 is relatively wide, and the first and second handles 16, 18 may be in, or close to the first end position thereof, as explained above.

The intestine separating device 2, in particular the guiding device thereof, comprising the first guiding member 6 and the second guiding member 8, is brought into contact with the surface of the intestine 80 moving in its longitudinal direction towards the wheel 86.

While the surface of the intestine 80 contacts the first guiding surface 36 of the first guiding member 6, and the second guiding surface 38 of the second guiding member 8, the first and second guiding surfaces 36, 38 extending substantially parallel to the surface of the intestine 80, the tissue 82 is guided into the gap 40 defined between the first guiding member 6 and the second guiding member 8. The gap 40 is relatively wide, and the first and second handles 16, 18 of the intestine separating device 2 may be in, or close to the first end position thereof, as explained above.

After starting the guiding of a first part of the tissue 82 into the gap 40, the first and second handles 16, 18 are moved towards their second end position, so as to move the first guiding member 6 and the second guiding member 8 towards each other to decrease the width of the gap 40 such as to exert a friction force on the tissue 82. If present, a locking member 21 may be brought into a locking state to fix the positions of the first guiding member 6 and the second guiding member 8 relative to one another.

The tissue separating device, i.e. the circle knife 43 driven in rotation by the motor 45, will provide a separation in the tissue 82 in the gap 40, by maintaining a decreased width of the gap 40 during a guiding of the remaining part of the tissue 82 in the gap 40. The separation is at a short distance from the surface of the intestine 80, where the distance is determined by the distance between, on the one hand, the first and second guiding surfaces 36, 38 and, on the other hand, the part of the cutting edge of the circle knife 43 in the gap 40. The former distance may be less than 4 mm. A minimal amount of tissue 82 comprising cut whiskers 84 remains attached to the intestine 80, as indicated by 85.

If a small intestine 80, which still is connected to a large intestine, is concerned in the tissue separation process, then at or near to the connection of the small intestine 80 to the large intestine the first and second guiding members 6 and 8 may be moved away from each other again to widen the gap 40, and said connection can be broken by accommodating the small intestine 80 into the gap 40 and using the circle knife 43 to actually break the connection.

After separation of the tissue 82 from the intestine 80, the intestine 80 remains wound on the wheel 86 for further processing.

As explained in detail above, for separating an intestine from a cluster of organs harvested from an animal, in particular a pig, cow or sheep, wherein the intestine is connected to the remainder of the cluster through tissue, a device and method are provided. The device comprises a guiding device having at least one guiding surface configured to contact the intestine. The guiding device comprises a first and second guiding members together defining a gap for accommodating said tissue. The first and second guiding members are movable towards and away from each other to vary a gap width. A tissue separating device is operative in the gap to provide a separation in the tissue close to the intestine.

It is noted that the present invention may also be recognized as relating to a device for separating an intestine from a cluster of organs harvested from an animal, in particular a pig, cow or sheep, the intestine being connected to the remainder of the cluster through tissue, the device comprising: a guiding device having at least one guiding surface configured to contact the intestine, the guiding device defining a gap being configured to accommodate said tissue; and a tissue separating device configured to be operative in the gap to provide a separation in the tissue close to the intestine, wherein the tissue separating device comprises a rotatably driven cutting member, and embodiments of such intestine separating device as described herein. In such embodiments, the guiding device may or may not comprise a first guiding member and a second guiding member together defining the gap, and may or may not have a first guiding member and a second guiding member being movable towards and away from each other to vary a gap width, and embodiments thereof as described herein.

As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting, but rather, to provide an understandable description of the invention.

The terms "a" or "an", as used herein, are defined as one or more than one. The term plurality, as used herein, is defined as two or more than two. The term another, as used herein, is defined as at least a second or more. The terms including and/or having, as used herein, are defined as comprising (i.e., open language, not excluding other elements or steps). Any reference signs in the claims should not be construed as limiting the scope of the claims or the invention.

The mere fact that certain measures are recited in mutually different dependent claims does not indicate that a combination of these measures cannot be used to advantage.

The invention claimed is:

1. A device for separating an intestine from a cluster of organs harvested from an animal, the intestine being connected to the remainder of the cluster through tissue, the device comprising:
   a guiding device having at least one guiding surface configured to contact the intestine, the guiding device defining a gap being configured to accommodate said tissue; and
   a tissue separating device configured to be operative in the gap to provide a separation in the tissue close to the intestine,
   wherein the guiding device comprises a first guiding member and a second guiding member together defining the gap between the first guiding member and the second guiding member, the first guiding member and the second guiding member being movable towards and away from each other to vary a gap width,
   wherein the device further comprises:
   a gap width control structure comprising an actuator to controllably decrease the gap width, and to controllably increase the gap width.

2. The intestine separating device according to claim 1, wherein the first guiding member and the second guiding member are rotatable relative to one another to vary the gap width.

3. The intestine separating device according to claim 1, wherein the first guiding member comprises a first guiding surface, and a second guiding member comprises a second guiding surface, wherein the first guiding surface and the second guiding surface are configured to contact the intestine.

4. The intestine separating device according to claim 1, wherein the first guiding member comprises a first side facing a second side of the second guiding member, the first side and the second side together defining the gap.

5. The intestine separating device according to claim 4, wherein the first guiding member and the second guiding member each comprise a rounded end portion at a tissue inlet area of the gap.

6. The intestine separating device according to claim 1, wherein the gap comprises a tapering tissue inlet area.

7. The intestine separating device according to claim 1, wherein the actuator comprises a first handle and a second handle movable relative to each other, wherein the first guiding member is connected to the first handle, and the second guiding member is connected to the second handle, whereby the first guiding member and the second guiding member move towards each other to decrease the gap width of the guiding device when the first handle and the second handle move toward each other, and whereby the first guiding member and the second guiding member move away from each other to increase the gap width of the guiding device when the first handle and the second handle move away from each other.

8. The intestine separating device according to claim 7, wherein the first guiding member is fixedly connected to the first handle, and the second guiding member is coupled to the second handle by a mechanical transmission.

9. The intestine separating device according to claim 8, wherein the mechanical transmission comprises a linkage.

10. The intestine separating device according to claim 7, wherein the first handle and the second handle are rotatable relative to each other around a hinge axis.

11. The intestine separating device according to claim 7, further comprising a spring member for moving the first handle away from the second handle to a first end position relative to each other.

12. The intestine separating device according to claim 11, wherein the spring member is mounted between the first handle and the second handle.

13. The intestine separating device according to claim 7, further comprising a stop member for limiting a movement of the first handle and the second handle towards each other in a second end position relative to each other.

14. The intestine separating device according to claim 13, wherein the stop member is mounted between the first handle and the second handle.

15. The intestine separating device according to claim 1, further comprising a locking to lock and unlock the positions of the first guiding member and the second guiding member relative to each other.

16. The intestine separating device according to claim 1, wherein the tissue separating device comprises a rotatably driven cutting member.

17. The intestine separating device according to claim 16, wherein the cutting member is circle knife having a peripheral cutting edge.

18. The intestine separating device according to claim 17, wherein the cutting edge is plain.

19. The intestine separating device according to claim 17, wherein part of the cutting edge extends across the gap.

20. The intestine separating device according to claim 16, wherein the cutting member extends in a plane extending at an angle between 20° and 60°, and more in particular about 45°, to the guiding surface of the guiding device.

21. The intestine separating device according to claim 16, wherein the cutting member is driven by a hydraulic motor.

22. The intestine separating device according to claim 16, wherein the cutting member is driven by a pneumatic motor.

23. The intestine separating device according to claim 1, wherein the tissue separating device comprises a water jet cutter.

24. The intestine separating device according to claim 1, further comprising a water supply duct configured to supply water to the tissue separating device.

25. The intestine separating device according to claim 24, wherein the cutting member is driven by a hydraulic motor, and wherein the hydraulic motor is coupled to the water supply duct.

26. The intestine separating device according to claim 1, wherein the animal is one of a pig, a cow and a sheep.

27. A method of separating an intestine from a cluster of organs harvested from an animal, the intestine being connected to the remainder of the cluster through tissue, the method comprising:
- moving the intestine in its longitudinal direction relative to a guiding device;
- guiding the tissue into a gap of the guiding device, at least one guiding surface of the guiding device contacting the intestine;
- providing, in the gap, a separation in the tissue close to the intestine,
- wherein the guiding device comprises a first guiding member and a second guiding member being movable towards and away from each other to vary a gap width,
- wherein the method further comprises:
- before starting the guiding of the tissue into the gap, positioning the first guiding member and the second guiding member away from each other to set a width of the gap;
- after starting the guiding of a first part of the tissue into the gap, moving the first guiding member and the second guiding member towards each other to decrease the width of the gap to exert a friction force on the tissue; and
- maintaining a decreased width of the gap during a guiding of the remaining part of the tissue in the gap.

28. The method according to claim 27, wherein the first guiding member is connected to a first handle, and the second guiding member is connected to a second handle, whereby the first guiding member and the second guiding member move towards each other to decrease the gap of the guiding device when the first handle and the second handle move toward each other, and whereby the first guiding member and the second guiding member move away from each other to increase the gap of the guiding device when the first handle and the second handle move away from each other.

29. The method according to claim 27, wherein the step of providing a separation in the tissue comprises cutting the tissue by a rotating cutting member.

30. The method according to claim 27, wherein the animal is one of a pig, a cow and a sheep.

* * * * *